R. E. MANLEY.
COLLAPSIBLE HOIST.
APPLICATION FILED MAR. 25, 1919.
1,354,501.
Patented Oct. 5, 1920.
2 SHEETS—SHEET 2.
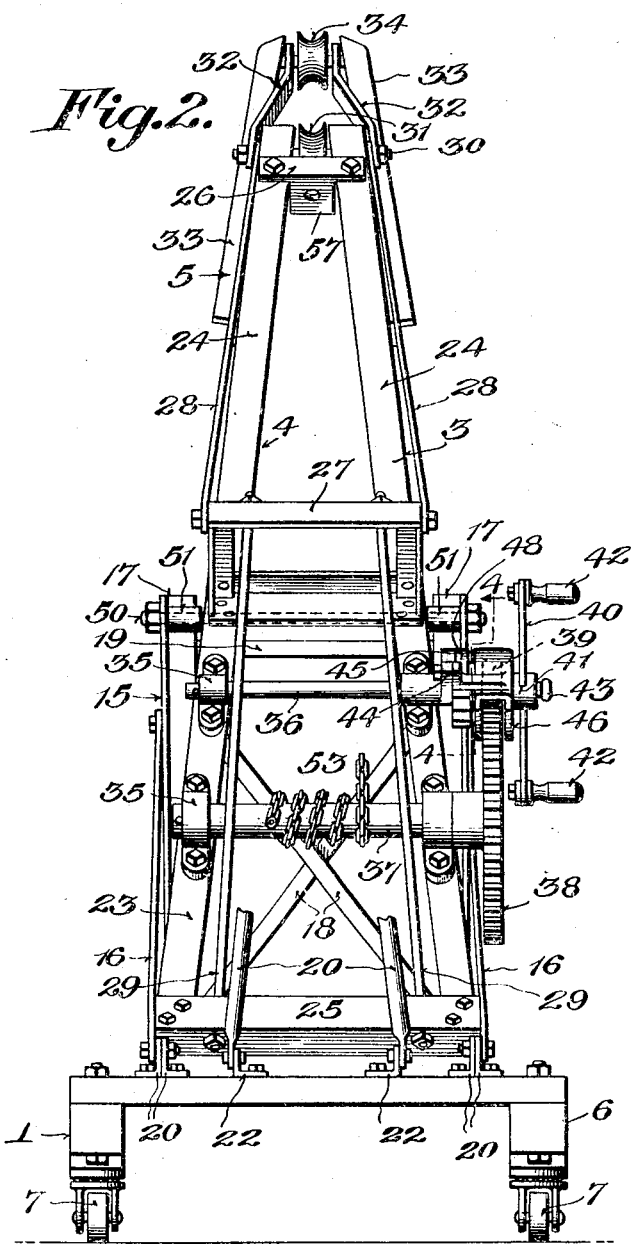
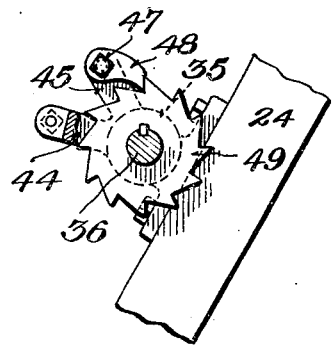
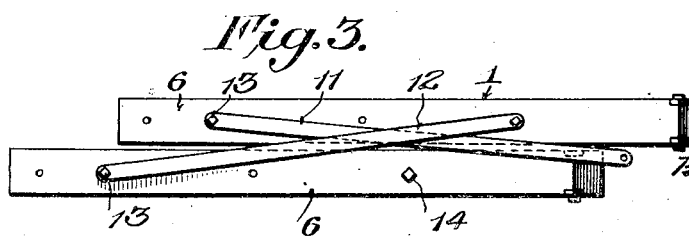
Inventor
Robert E. Manley

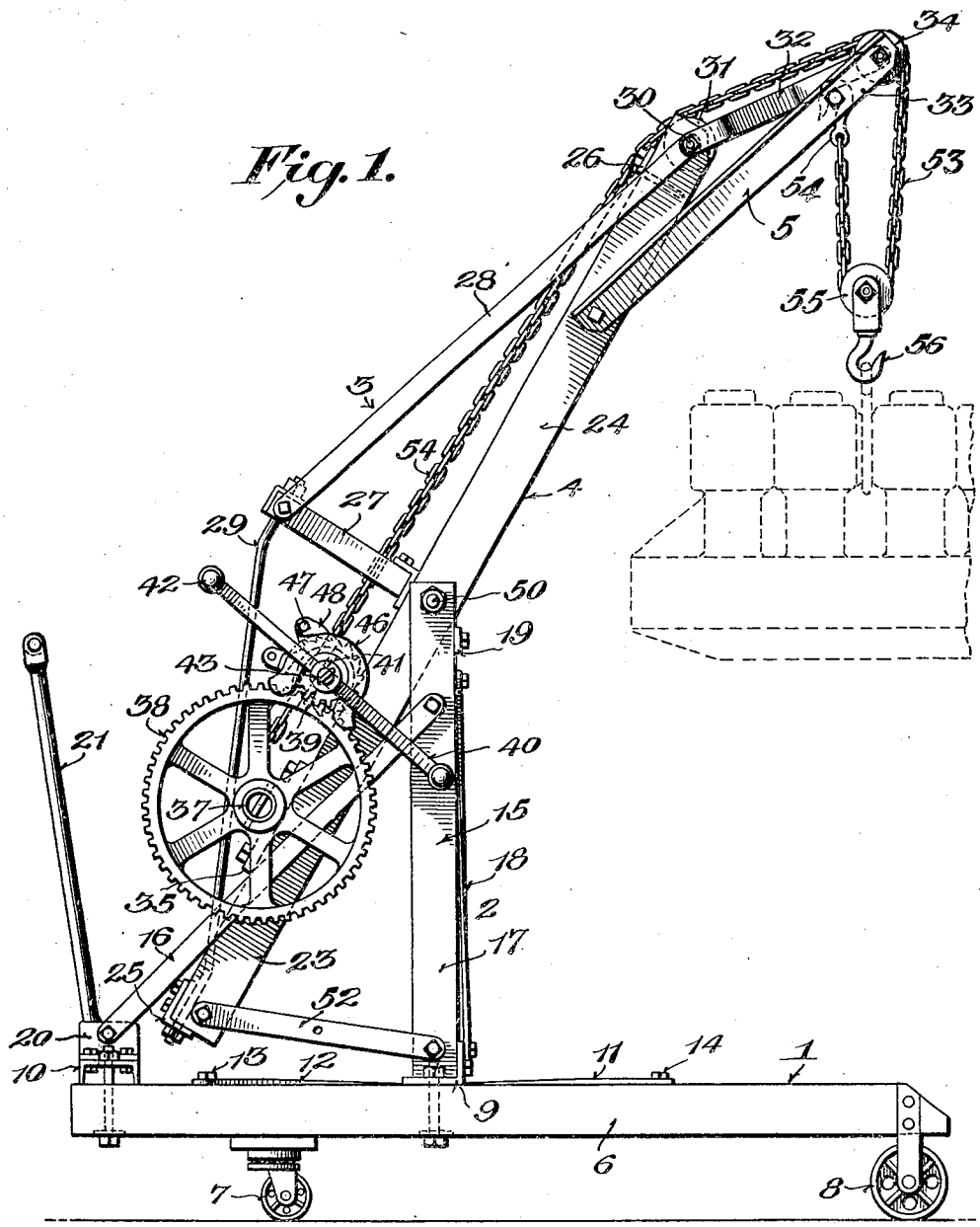

UNITED STATES PATENT OFFICE.

ROBERT E. MANLEY, OF HANOVER, PENNSYLVANIA, ASSIGNOR TO THE MANLEY MANUFACTURING COMPANY, OF YORK, PENNSYLVANIA, A CORPORATION OF PENNSYLVANIA.

COLLAPSIBLE HOIST.

1,354,501.      Specification of Letters Patent.      Patented Oct. 5, 1920.

Application filed March 25, 1919. Serial No. 284,892.

*To all whom it may concern:*

Be it known that I, ROBERT E. MANLEY, a citizen of the United States, residing at Hanover, in the county of York and State of Pennsylvania, have invented certain new and useful Improvements in Collapsible Hoists; and I do hereby declare the following to be a full, clear, and exact description of the same, reference being had to the accompanying drawings, forming part of this specification.

This invention relates to small cranes or portable hoists peculiarly adapted to use in automobile repair work, although not limited to any particular field of usefulness.

The object of the invention is to provide a knock-down, portable hoist that is strong and efficient in use and may be quickly set up, either on a wheeled truck or on a solid base, such as the platform of a large road auto repair truck.

A further object is to provide a crane of simple construction, which, while as adaptable and efficient as previous models, is stronger and simpler by reason of the arrangements of the various parts.

In the drawings,—

Figure 1 is a side elevation of my device in its preferred construction;

Fig. 2 is an end view of the same;

Fig. 3 is a plan view of the wheeled truck in its knock-down state; and

Fig. 4 is a detail view of the ratchet mechanism.

My improved crane consists in three principal parts, to-wit, the truck 1, the main frame 2, and the superstructure 3, the latter in turn being made up of a pivoted truss 4 and a detachable extension 5.

The truck may be of any form, but in its preferred construction consists of a pair of matched, built-up wooden beams 6 each carrying a pivoted and a fixed wheel 7 and 8, respectively, and being connected together by an angle bar girder 9, a rear cross-bar 10, preferably a channel, and by links 11 and 12. The two bars are detachably secured to the beams but the links have three permanent securing members 13 and one removable member 14, the latter being removed when it is desired to collapse the truck, the links then turning on the pivots 13 and permitting the beams to lie parallel in collapsed position, as shown in Fig. 3.

The main frame 2 is composed of a panel 15 and braces 16, the former being built up of a pair of uprights 17, preferably angle bars, latticed by tie-rods 18 and a stay 19, the latter forming the top of the panel while the girder 9 forms the bottom. The braces 16 are bolted to the uprights 17 and to T's 20 formed of a pair of angles and bolted to the channel bar 10. The latter also carries a pulling handle 21 conveniently formed of piping and pivoted to the rear cross bar 10 in any desired manner as at 22.

The boom 23, composed of two converging, longitudinal angle bars 24, joined at the large end by a transverse angle bar 25 and at the small end by a plate 26, is strengthened by an open rectangular boxing 27 acting as a king-post and furnishing support for the diagonals 28 and tension rods 29, the latter secured to the transverse bar 25 while the diagonals are secured to the main angle bars by a bolt 30 which forms the axle of a sheave 31 and is sufficiently long to accommodate not only the angle bars and diagonals, but also a pair of arms 32 forming the tension members for the extension bars 33 when the latter is used. This extension 5 carries a pulley 34 at its end and permits a greater overhang in certain cases than is possible with the pivoted truss alone.

Journaled in bearings 35 on each of the angle bars 24 are two parallel shafts 36 and 37, the latter being of sufficient size to form a chain drum. On this drum shaft is mounted a gear wheel 38 meshing with a pinion 39 on shaft 36. Drive shaft 36 receives its power through an adjustable crank 40, passing through a slot 41 in the hub of pinion 39 and having two operating handles 42 and being held in adjusted position by a set screw 43. One of the journals 35 is provided with two lugs 44 and 45, the former supporting a safety casing 46 while the latter carries a stub shaft 47 on which a pawl 48 is mounted to coöperate with ratchet wheel 49 fixed on the pinion shaft.

To assemble the device the truck is first opened to the proper width and the fastener 14 inserted. The two cross bars are next bolted to the truck and the braces 16 secured to the uprights 17. The superstructure is then lifted into position between the uprights and allowed to rest on the stay or rest 19, while being tilted to the angle necessary to permit the king bolt 50 to be inserted in position. Preferably I provide a pair of spacers or sleeves 51 to maintain the truss properly centered on the frame. A pair of guy rods 52 holds the truss at the desired angle and by providing different length guys angular relation may be secured. The horizontal position of the truss is maintained by a plurality of guy rods bolted together, this being a convenient construction, since these guys take only tension. It will be noted from the various figures that the several members take either tension or compression, but are so arranged that it never becomes necessary to reverse the stress imposed upon any given member, that is, no compression member is ever called upon to sustain tension and vice versa.

The hoisting chain 53 is secured to the drum 37 and passes over pulleys 31 and 34 and either ends in a hook 54 to sustain the load or passes under the pulley 55 of a swiveled hook 56 as in Fig. 1, and the hook 54 is secured to the down-turned perforated lip 57 of the plate 26.

When used as a road repair hoist, my device is preferably bolted directly to the platform of the auto-truck, the wheeled support 1 not being necessary at such time.

What is claimed is:

1. A hoist structure including a rectangular panel main frame, a king bolt in said frame, a tapered truss pivoted on said bolt, sleeves on said bolt for spacing the truss from the frame, hoisting mechanism on said truss, a detachable extension on said truss, and rigid means for holding said truss and extension in any one of a plurality of positions with respect to the upright panel.

2. A hoist structure including a collapsible wheeled truck, uprights thereon, a super-structure detachably pivoted thereto, hoisting mechanism carried thereby, extension members detachably secured to the super-structure for providing increased overhang, and means for securing the super-structure in various positions about its pivot.

3. A knock-down hoist structure consisting of a collapsible base member, uprights secured thereto, a super-structure built up of metal shapes detachably pivoted to the uprights, and means for supporting the super-structure while its pivot is being inserted.

4. A tapered pivoted truss super-structure for a hoist structure composed of a plurality of angle bars, a transverse bar connecting the ends of said angle bars, a pulley pivoted to the other ends of the angle bars and spaced therefrom, hoisting mechanism on said angle bars, a second transverse member located in proximity to said pulley and serving to reinforce the super-structure and to afford a securing means for the end of the hoist chain.

ROBERT E. MANLEY.